UNITED STATES PATENT OFFICE 2,503,385

PRODUCTION OF 7-DEHYDROSTEROL ESTERS

David H. Gould, New York, N. Y., assignor to Nopco Chemical Company, Harrison, N. J., a corporation of New Jersey No Drawing. Application April 14, 1948, Serial No. 21,099

12 Claims. (Cl. 260—397.2)

This invention relates to 7-dehydrosterol esters and more particularly to an improved process for isolating such esters after they have been produced.

In copending application Serial No. 793,757, filed December 24, 1947, now Patent No. 2,500,576, by William L. Ruigh, there is disclosed and claimed a highly improved method for separating 7-dehydrosterol esters from the other components of the dehydrohalogenation reaction mixture in which the 7-dehydrosterol esters are formed. In that separation process, the dehydrohalogenation reaction mixture is first dissolved in an excess of a solvent selected from the group consisting of aliphatic alcohols, aliphatic esters, and aliphatic ketones, said solvent containing not more than five carbon atoms; and thereafter the solvent solution of the dehydrohalogenation reaction mixture is cooled to a temperature somewhat below room temperature whereupon the desired 7-dehydrosterol esters will crystallize and may be readily separated from the other components of the dehydrohalogenation reaction mixture which remain in solution in the organic solvent.

The method of recovering 7-dehydrosterol esters which is outlined in the above-identified application is a great improvement over prior art processes for separating 7-dehydrosterol esters from the dehydrohalogenation reaction mixtures in which the 7-dehydrosterol esters are formed. In many cases, however, the crystalline 7-dehydrosterol esters obtained in accordance with the process of the above-identified application have a somewhat gummy appearance and form. The gumminess of such crystals may in part be due to various impurities which separate from the dehydrohalogenation reaction mixture along with the desired 7-dehydrosterol esters, and it may in part be due to the shape which the individual crystals assume as they are formed during the step of crystallizing the 7-dehydrosterol esters from the solvent solution of the dehydrohalogenation reaction mixture. Whatever may be the full explanation of such gumminess, there is no doubt but that such gumminess is quite objectionable. For one thing some of the gummy crystals may adhere to the filter media when the gummy crystalline 7-dehydrosterol ester is removed from the cooled solvent solution of the dehydrohalogenation reaction mixture by filtration thus resulting in a loss of valuable 7-dehydrosterol ester when the 7-dehydrosterol ester is removed from filter media. Furthermore, since some of the gumminess is undoubtedly due to at least small amounts of impurities which are associated with the gummy crystalline 7-dehydrosterol esters, it is apparent that the gummy products are not of as high a degree of purity as would be the case if such gumminess could be eliminated. A further point with regard to the gumminess of the 7-dehydrosterol esters is that if such gumminess could be eliminated, the subsequent physical handling of the crystalline 7-dehydrosterol esters would be greatly facilitated. For example, the gummy 7-dehydrosterol esters in some cases have the appearance of oily semi-solids and there is a tendency for such products to pass on through the filter media, particularly if the filtration is carried out under rigorous conditions as when strong suction is applied to the filtration device. It would be highly advantageous if it were possible to eliminate the gumminess of the esters before attempting to remove the last traces of the crystallization solvent therefrom. In such cases, if the majority of the crystallization solvent were first removed from the crystallized esters by means such as decantation or by filtering off the majority of the solvent employing only a very slight suction, if any, which means would not result in any loss of valuable 7-dehydrosterol esters, and then if it were possible to treat the gummy and oily-like 7-dehydrosterol esters so as to eliminate such gumminess and oiliness, the final recovery of the 7-dehydrosterol esters would be greatly facilitated.

Another characteristic of many crude 7-dehydrosterol esters which tends to lessen their value is that they are frequently rather dark in color.

It is the object of this invention to provide a method for treating 7-dehydrosterol esters of a gummy nature so as to convert them into non-gummy, crystalline materials.

A further object of this invention is to provide a method for treating 7-dehydrosterol esters of a gummy nature so as to improve the purity of such esters.

Another object of the invention is to provide a method for treating 7-dehydrosterol esters so as to improve the color thereof.

Other objects of the invention will in part be obvious and will in part appear hereinafter.

I have discovered that the above and other objects of the invention may be accomplished by treating a 7-dehydrosterol ester which is of a gummy nature with a saturated aliphatic hydrocarbon solvent containing from four to seven carbon atoms which has been cooled to a temperature of about 0° C. or below and preferably to a temperature of about —15° C. or below. Upon separating the solvent from the 7-dehydrosterol ester, it will be found that the 7-dehydrosterol ester has been completely freed of its gummy characteristics. Furthermore, the 7-dehydrosterol ester will show an improvement in purity thereof as compared to its purity prior to being treated by the process of my invention. Also, it will be found that the 7-dehydrosterol esters will in most cases be greatly improved as far as the color thereof is concerned since the crude, gummy 7-dehydrosterol esters are usually relatively dark in color, and the process of my invention converts such esters into light colored crystalline products and in many cases into completely white crystalline products.

Any 7-dehydrosterol ester which is of a gummy nature may advantageously be treated by the process of my invention even though such gumminess is present to only a slight degree. The process of my invention is particularly well suited to the treatment of esters of 7-dehydrocholesterol whenever such esters are of a gummy nature. My process may advantageously be employed in conjunction with the process for recovering 7-dehydrosterol esters from the dehydrohalogenation reaction mixtures in which they are formed which is disclosed and claimed in the copending application of William L. Ruigh referred to hereinabove; however, it is to be understood that the process of my invention is not limited to the treatment of esters of 7-dehydrosterols which have been so recovered. As illustrative examples of 7-dehydrosterol esters which may be treated by the process of my invention there may be mentioned esters of 7-dehydrocholesterol such as the benzoate, dinitrobenzoate, acetate, propionate, butyrate, etc.; the corresponding esters of 7-dehydrosterols produced from sterols such as β-sitosterol, epicholesterol, campesterol, 22,23 dihydrobrassicasterol, etc.

Solvents which may be employed in the process of my invention are the saturated aliphatic hydrocarbons containing from four to seven carbon atoms or mixtures of such solvents. Thus butane, pentane, hexane or heptane, or mixtures of such solvents, e. g. petroleum ether, may all suitably be utilized in carrying out the process of my invention.

In order to obtain the desired results, it is necessary that the solvents be at a temperature of at least about 0° C. or below and preferably at a temperature of about −15° C. or below when they are employed in the process of the invention. It is also desirable that the 7-dehydrosterol ester and the apparatus in which the process is carried out be at just as low a temperature as the hydrocarbon solvent. Thus, the entire process is preferably carried out in a refrigerated room or "cold room" maintained at a temperature of 0° C. or below. It is not strictly necessary, of course, that the 7-dehydrosterol ester and the apparatus employed be cooled to a temperature any lower than room temperature prior to carrying out the process so long as the solvent itself has been cooled to a low temperature as specified hereinabove.

In carrying out the process of my invention the gummy 7-dehydrosterol ester which is to be treated by the process of the invention is contacted with at least twice its volume of one of the hydrocarbon solvents referred to hereinabove which has previously been cooled to a temperature of at least 0° C. or below. Larger ratios of solvent to dehydrosterol ester may be employed if desired; however, ratios of solvent to dehydrosterol ester in excess of ten to one offer no advantage. The 7-dehydrosterol ester and the cold solvent may be admixed in any desired manner. After the cold solvent has been thoroughly contacted with the 7-dehydrosterol ester, the cold solvent is separated from the ester by any suitable means such as filtration, centrifugation, decantation, etc. Upon removal of the solvent from the ester, it will be found that the ester will have lost all trace of its original gummy nature; it will be of higher purity than it was prior to such treatment; and the ester will be lighter in color than it was before such treatment. Elimination of the gumminess of the 7-dehydrosterol ester obviates any possibility of loss of the valuable ester by its adhering to the filter media, and furthermore the 7-dehydrosterol ester will be more readily handled than would be the case if such gumminess were not eliminated.

Probably the most convenient manner in which to carry out the process of my invention, particularly when it is employed to treat 7-dehydrosterol esters which have been recovered from the dehydrohalogenation reaction mixtures in which they are formed in accordance with the process disclosed and claimed in the copending application of William L. Ruigh referred to above, is to treat the 7-dehydrosterol esters by the process of my invention immediately after they have been separated from the dehydrohalogenation reaction mixture. Thus the gummy 7-dehydrosterol esters may be immediately contacted with one of the cold solvents specified hereinabove, the contacting of the ester with the cold solvent being carried out in the filtering or centrifuging device used to separate the ester from the dehydrohalogenation reaction mixture prior to removal of the separated ester from such separation device. The treated ester is then separated from the cold solvent in the same manner in which it was separated from the dehydrohalogenation reaction mixture, i. e. by filtration, centrifugation, etc., as the case may be. However, if desired, the gummy 7-dehydrosterol ester may first be removed from the apparatus employed to separate it from the dehydrohalogenation reaction mixture and then placed in a different vessel before it is treated by the process of my invention. In such a case, after it has been treated with the cold solvent in accordance with the process of my invention, it may be separated from the cold solvent by any convenient means, e. g. by filtration, centrifugation, decantation, etc.

For a fuller understanding of the nature and objects of the invention, reference may be had to the following examples which are intended merely as further illustrations of the invention and are not to be construed in a limiting sense.

*Example I*

7-bromocholesteryl benzoate (480 grams) was dehydrohalogenated by dissolving it in diethylaniline (480 ml.) and heating the resulting solution at about 95° C. for three hours. The solution was then admixed with five volumes (2400 ml.) of boiling hot methanol. The resulting mixture was chilled to −15° C. and after the mixture had been maintained at that temperature for three hours, the 7-dehydrocholesteryl benzoate which had crystallized out was filtered off at the low temperature. The material recovered was rather sticky and gummy and of a dark color. The gummy material was then, without being removed from the filtration apparatus, thoroughly agitated with a total of four volumes (2000 ml.) of pentane which had been cooled to −15° C., and the cold pentane then filtered off leaving 7-dehydrocholesteryl benzoate which was light in color and which had an excellent non-gummy, crystalline structure.

Example II

A fifty gram sample of 7-bromocholesteryl benzoate was heated for one hour at a temperature of about 95° C. with 50 ml. of diethylaniline. Then 250 ml. of boiling methanol were added with vigorous shaking and the mixture thereafter cooled to —15° C. and kept at that temperature for one hour. The yellow, lumpy precipitate which separated from the cold solution was recovered by filtering the cold mixture through a Buchner funnel at the low temperature. The precipitate of 7-dehydrocholesteryl benzoate which collected on the filter paper was then thoroughly washed with several successive 50 ml. portions of pentane which had been cooled to —15° C. This treatment converted the yellow, lumpy precipitate which had been collected on the filter paper into a white, crystalline powder.

Example III

The same amount of 7-bromocholesteryl benzoate as was employed in Example II was converted to 7-dehydrocholesteryl benzoate by essentially the same process as was employed in Example II with the exception that during the dehydrohalogenation, the reaction mixture was heated at about 125° C. instead of at about 95° C. as in Example II. When the hot methanol was added to the dehydrohalogenation reaction mixture, the 7-dehydrocholesteryl benzoate separated from the resulting solution in the form of an oily semi-solid. On cooling the mixture to —15° C. and maintaining it at that temperature for several hours, the oily 7-dehydrocholesteryl benzoate formed into a solid, light brown cake which was found to be rather tacky and gummy when it was broken up and removed from the mixture by filtration thereof at the low temperature. The brown, gummy 7-dehydrocholesteryl benzoate on being washed with four successive 50 ml. portions of pentane which had been cooled to —15° C. was converted into a very light colored, well-crystallized material entirely free from gumminess.

Example IV

A forty gram sample of 7-bromocholesteryl benzoate was dehydrohalogenated by dissolving it in 600 ml. of diethylaniline and heating the resulting solution for three hours at about 95° C. After withdrawing one-fifth of the resulting solution for other purposes, the remaining solution was heated under reduced pressure and diethylaniline was distilled off until the solution had been concentrated to about 40 ml. Five volumes (200 ml.) of methanol were then added to the concentrated solution and the resulting mixture was slowly chilled to —15° C. The 7-dehydrocholesteryl benzoate precipitated as a dark, gummy material and was recovered by filtration of the mixture at the low temperature. The dark, gummy product was then thoroughly washed with 200 ml. of pentane which had been cooled to —15° C. Upon filtering off the cold pentane, the 7-dehydrocholesteryl benzoate was recovered as a white crystalline material.

Having described my invention, what I claim as new and desire to secure by Letters Patent is:

1. A process for improving the purity, physical appearance and crystalline nature of an ester of a 7-dehydrosterol which comprises admixing an ester of a 7-dehydrosterol with at least two volumes of a saturated aliphatic hydrocarbon solvent containing from four to seven carbon atoms, said solvent being at a temperature at least as low as about 0° C., and then separating said solvent from the ester of the 7-dehydrosterol by means other than evaporation.

2. A process for improving the purity, physical appearance and crystalline nature of an ester of 7-dehydrocholesterol which comprises admixing an ester of 7-dehydrocholesterol with at least two volumes of a saturated aliphatic hydrocarbon solvent containing from four to seven carbon atoms, said solvent being at a temperature at least as low as about 0° C., and then separating said solvent from the ester of the 7-dehydrocholesterol by means other than evaporation.

3. A process for improving the purity, physical appearance and crystalline nature of 7-dehydrocholesteryl benzoate which comprises admixing 7-dehydrocholesteryl benzoate with at least two volumes of a saturated aliphatic hydrocarbon solvent containing from four to seven carbon atoms, said solvent being at a temperature at least as low as about 0° C., and then separating said solvent from the 7-dehydrocholesteryl benzoate by means other than evaporation.

4. A process for improving the purity, physical appearance and crystalline nature of 7-dehydrocholesteryl acetate which comprises admixing 7-dehydrocholesteryl acetate with at least two volumes of a saturated aliphatic hydrocarbon solvent containing from four to seven carbon atoms, said solvent being at a temperature at least as low as about 0° C., and then separating said solvent from the 7-dehydrocholesteryl acetate by means other than evaporation.

5. A process for improving the purity, physical appearance and crystalline nature of a 7-dehydrosterol ester, said ester having been separated from the dehydrohalogenation reaction mixture in which it was formed by dissolving the dehydrohalogenation reaction mixture in an excess of an aliphatic alcohol containing not more than five carbon atoms, cooling the aliphatic alcohol solution of the dehydrohalogenation reaction mixture to a temperature somewhat below room temperature, and separating from the cooled alcohol solution the 7-dehydrosterol ester which crystallizes from the alcohol solution at the low temperature; which comprises contacting the 7-dehydrosterol ester so obtained with at least twice its volume of a saturated aliphatic hydrocarbon containing from four to seven carbon atoms which is at a temperature at least as low as about 0° C., the ester being contacted with such a cold solvent in the same apparatus employed to separate the crystallized ester from the alcohol solution of the dehydrohalogenation reaction mixture, and after the cold saturated aliphatic hydrocarbon solvent and the 7-dehydrosterol ester have been thoroughly contacted with each other separating the cold solvent from the treated ester by means of the separation apparatus in which the contacting of the ester with the cold solvent was carried out.

6. A process for improving the purity, physical appearance and crystalline nature of an ester of 7-dehydrocholesterol, said ester having been separated from the dehydrohalogenation reaction mixture in which it was formed by dissolving the dehydrohalogenation reaction mixture in an excess of an aliphatic alcohol containing not more than five carbon atoms, cooling the aliphatic alcohol solution of the dehydrohalogenation reaction mixture to a temperature somewhat below room temperature and separating from the cooled alcohol solution the 7-dehydrocholesterol ester which crystallizes from the alcohol solution at the low temperature; which comprises contacting the 7-dehydrocholesterol ester so obtained with at least twice its volume of a saturated aliphatic hydrocarbon containing from four to seven carbon atoms which is at a temperature at least as low as about 0° C., the ester being contacted with such a cold solvent in the same apparatus employed to separate the crystallized ester from the alcohol solution of the dehydrohalogenation reaction mixture, and after the cold saturated aliphatic hydrocarbon solvent and the 7-dehydrocholesterol ester have been thoroughly contacted with each other separating the cold solvent from the treated ester by means of the separation apparatus in which the contacting of the ester with the cold solvent was carried out.

7. The process of claim 6 wherein the saturated aliphatic hydrocarbon solvent is petroleum ether.

8. The process of claim 7 wherein the process is carried out at a temperature at least as low as about —15° C.

9. The process of claim 6 wherein the saturated aliphatic hydrocarbon solvent is pentane.

10. The process of claim 9 wherein the process is carried out at a temperature of at least as low as about —15° C.

11. The process of claim 6 wherein the saturated aliphatic hydrocarbon solvent is butane.

12. The process of claim 11 wherein the process is carried out at a temperature at least as low as about —15° C.

DAVID H. GOULD.

REFERENCES CITED

The following references are of record in the file of this patent:

UNITED STATES PATENTS

| Number | Name | Date |
|---|---|---|
| 2,173,629 | Milas | Sept. 19, 1939 |
| 2,266,674 | Boer | Dec. 16, 1941 |
| 2,441,091 | Vliet | May 4, 1948 |

FOREIGN PATENTS

| Number | Country | Date |
|---|---|---|
| 574,432 | Great Britain | Jan. 4, 1946 |